United States Patent Office 2,868,939
Patented Jan. 13, 1959

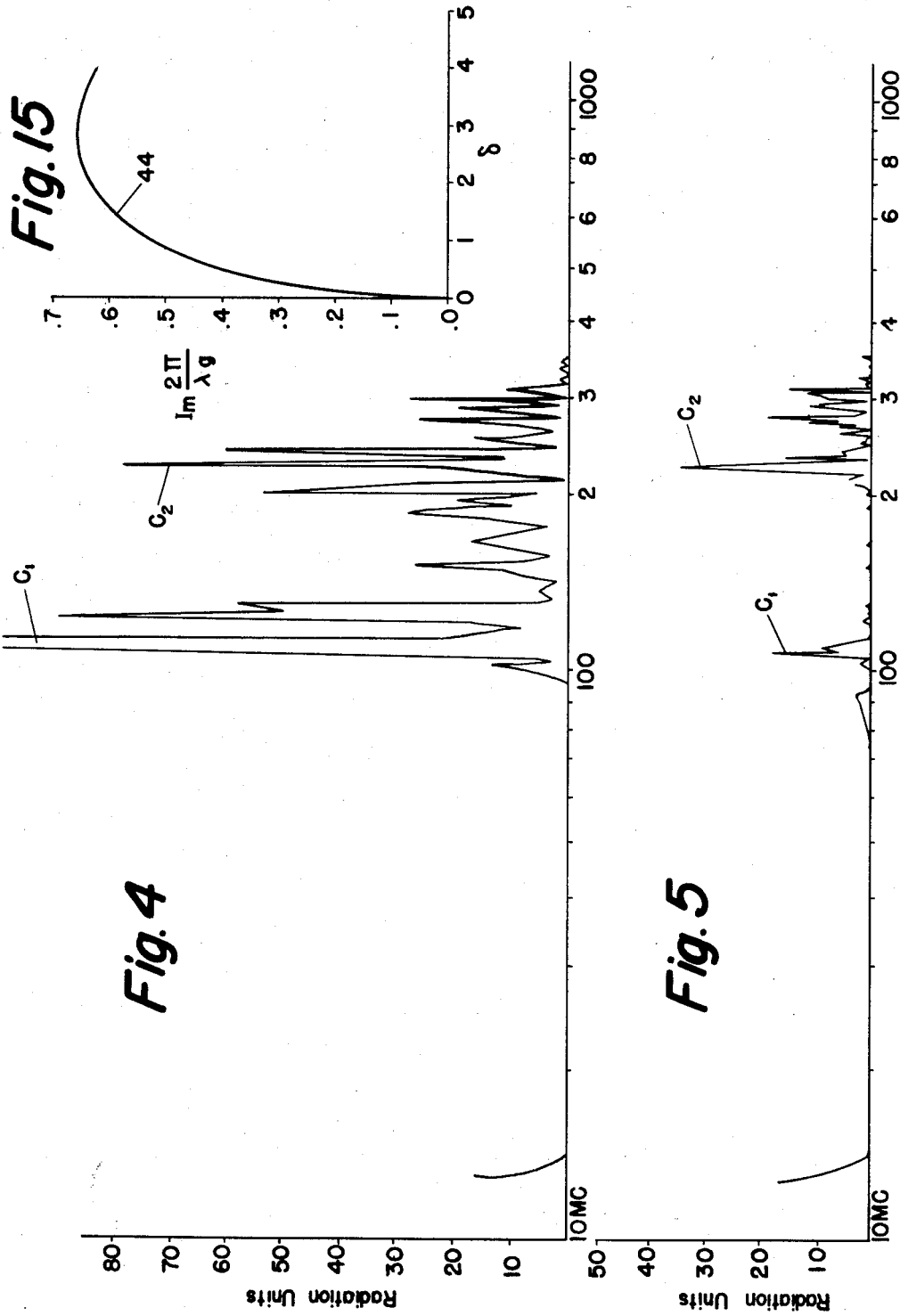

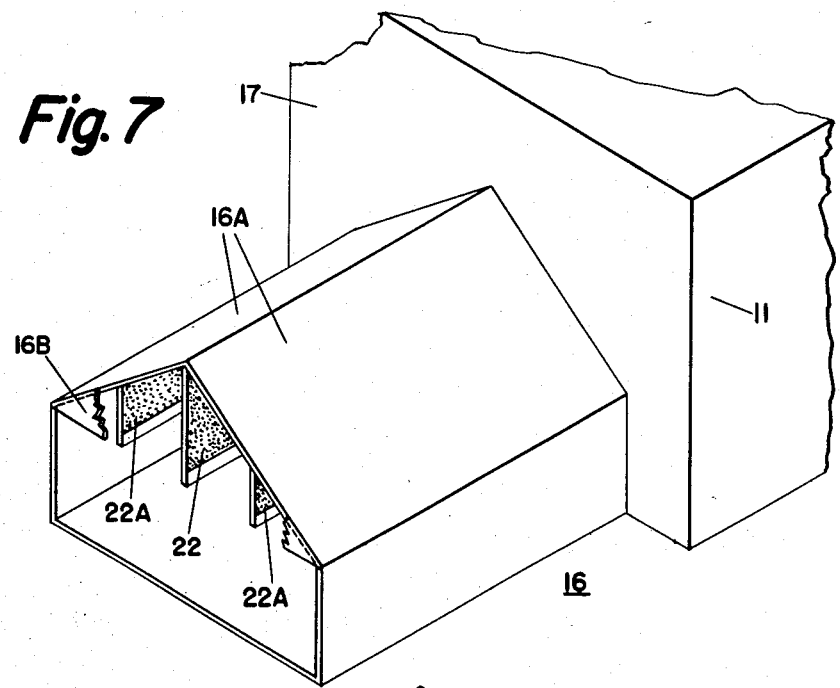
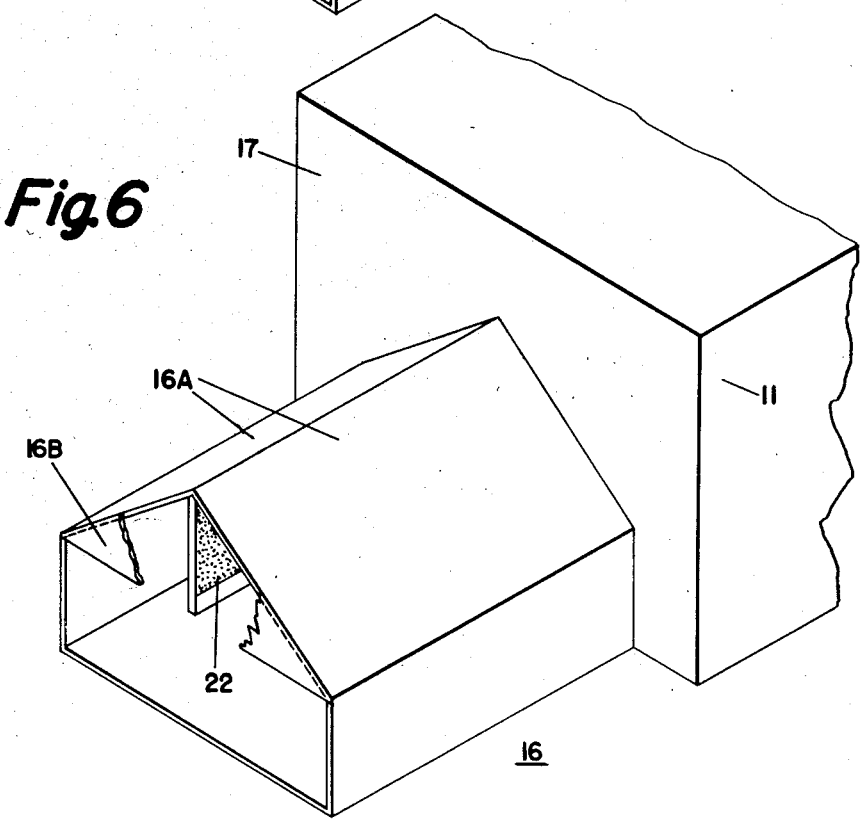

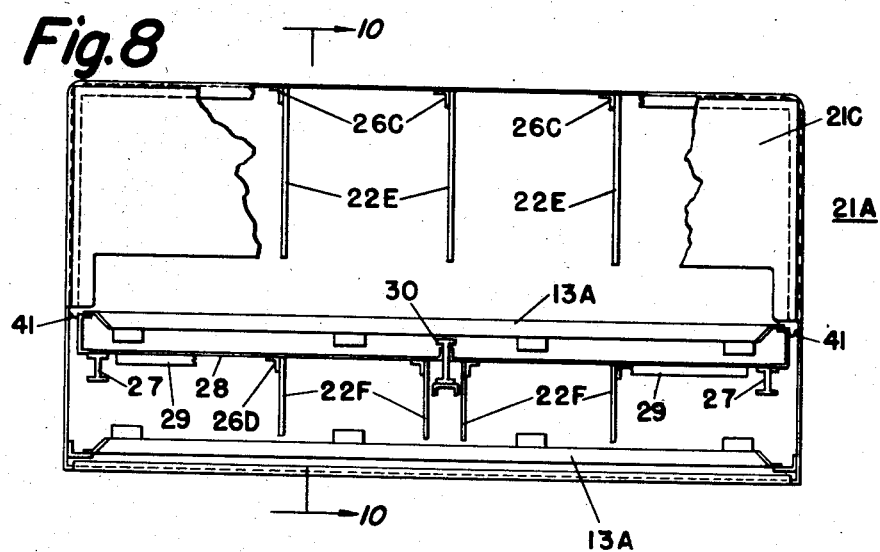
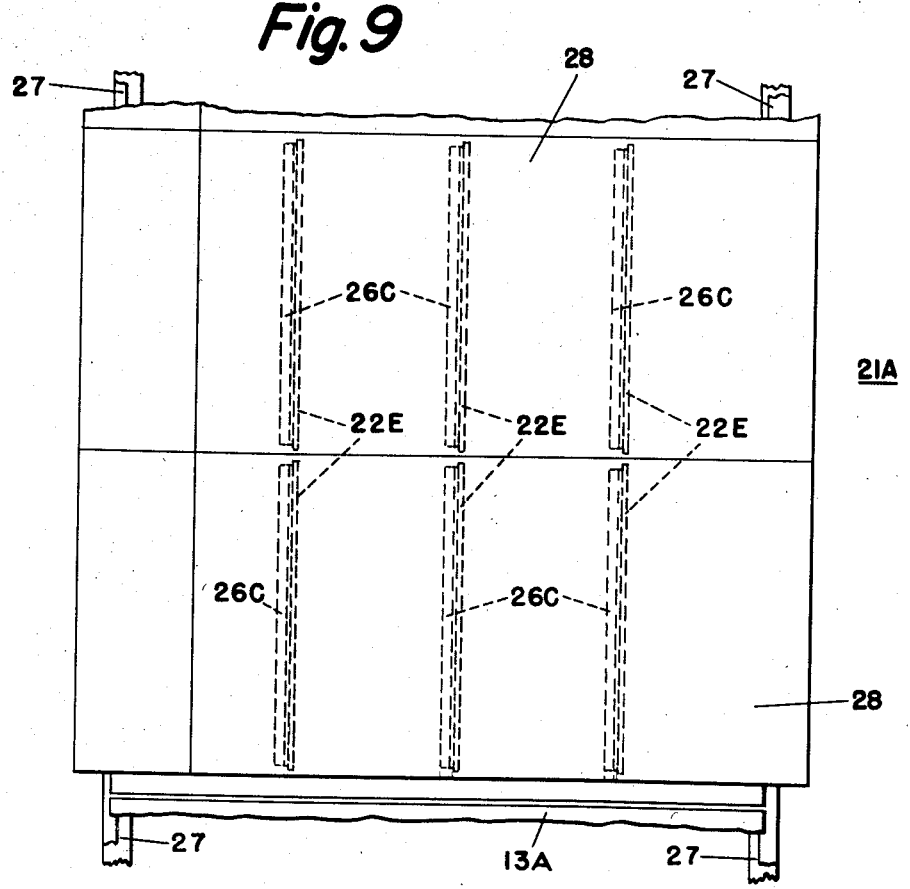

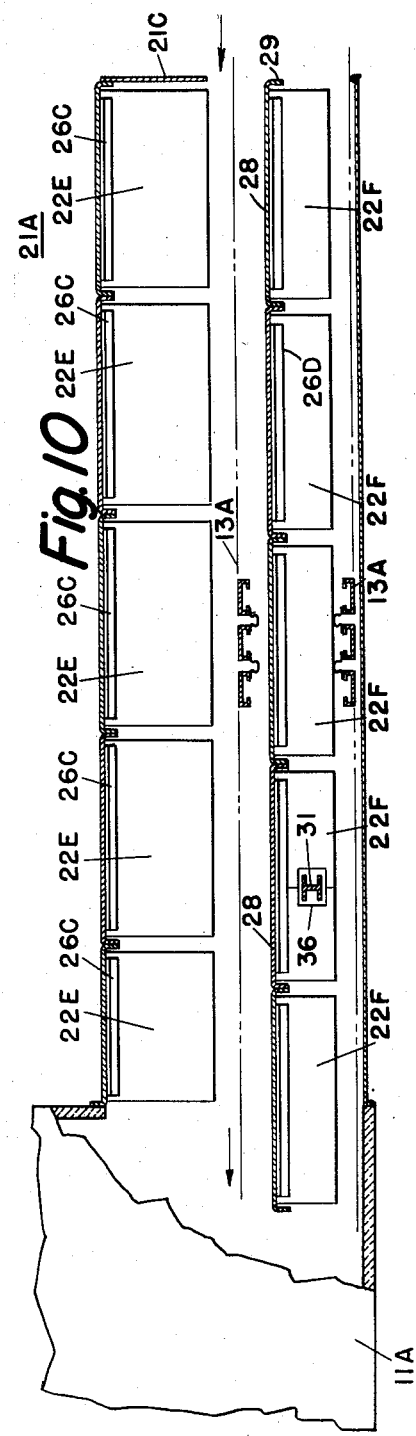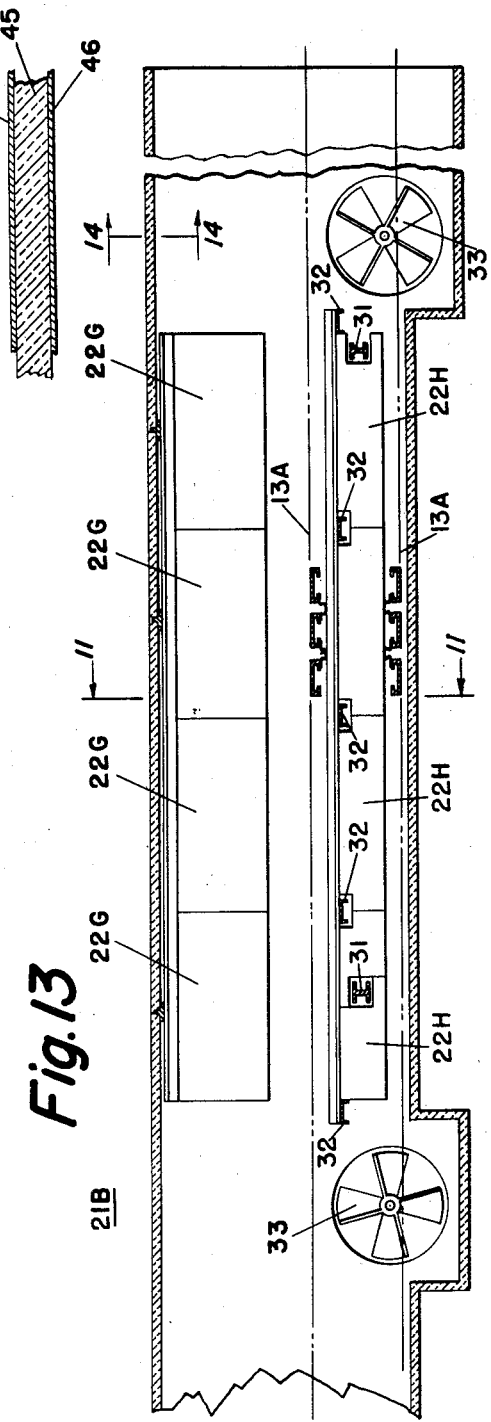

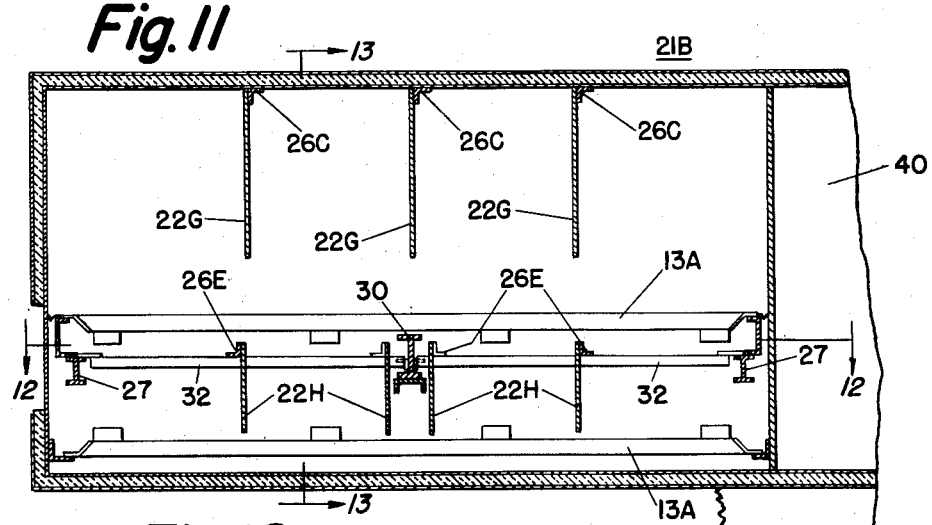
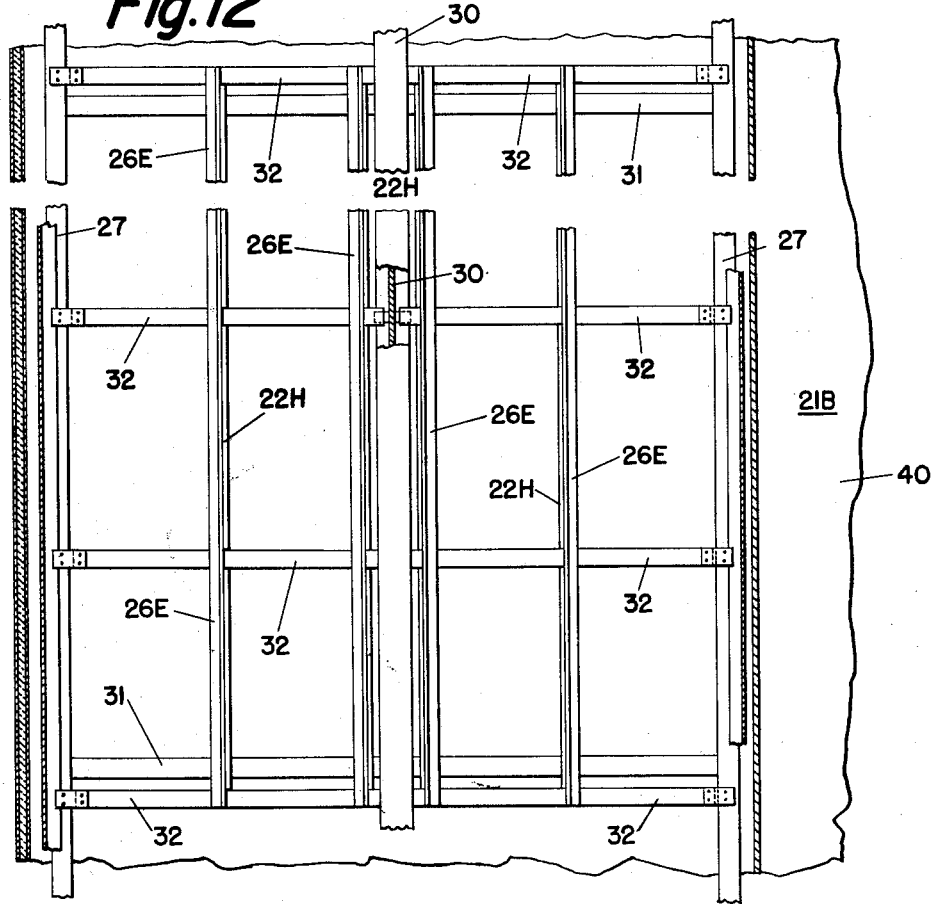

2,868,939

SUPPRESSION OF RADIATION FROM DIELECTRIC HEATING APPLICATORS

Robert V. Pound, Arlington, Mass., assignor to Chemetron Corporation, a corporation of Delaware Application January 16, 1956, Serial No. 559,147

24 Claims. (Cl. 219—10.55)

This invention relates to suppression of radiation from dielectric heating apparatus designed for heating of dielectric materials with high-frequency electric fields, more particularly from heating applicators of large physical size and operating at high-power levels as in drying of sand cores, wallboard panels, foam-rubber cushions, mattresses, and the like.

Usually such high-frequency applicators have a shielding enclosure with openings through which the work can be passed, as by a conveyor, into and out of the high-frequency field between the heating electrodes. In many cases, these applicators are provided with metallic vestibules in communication with said openings and extending outwardly from the walls of the shielding enclosure for the intended purpose of reducing high-frequency radiation from such openings. However, it has now been determined that in many cases such vestibules are not only ineffective to suppress radiation over a suitably wide frequency range, but are often responsible, at certain frequencies, for increasing the undesirable extraneous radiation beyond the level existent in the absence of the vestibules.

In accordance with the present invention, lossy material is disposed within the vestibules in a space clear of the work path to absorb and dissipate high-frequency energy appearing therein as a result of the electric-field heating of work within the shielding enclosure of a resonant cavity applicator. In one form of the invention, the high-frequency energy which would otherwise be radiated from the vestibules is attenuated by lossy panel structures disposed within the vestibules. In a preferred embodiment, such panel structures are disposed lengthwise of the vestibule and respectively in substantial coincidence with one or more of the planes of the maximum electric field vectors of the corresponding excitation modes of the vestibules as resonant cavities. The panels may be of any lossy dielectric material or preferably and equivalently they may be of wood or fabric, or the like, surfaced with resistive material such as a colloidal graphite suspension or other finely divided conductive material bonded to the panel to form a resistive film.

Further in accordance with the invention, the applicator vestibule in which the lossy material is disposed is shaped and dimensioned to have a waveguide cut-off frequency which is as high as feasible consistent with the physical size of the work to be heated for the reason a waveguide functions as a high-pass filter. More particularly, the width of the vestibule is as narrow as practical for passage of the work. The loaded cut-off frequency of the vestibule may be raised somewhat by gabling the roof or otherwise increasing the height above the work path of the upper wall structure of the vestibule. Such construction increases the number of lower order harmonics of the heating frequency which are attenuated by the vestibule. The lossy panel structures are located in the roof-space provided above the work-passage for attenuation of harmonic frequencies within the pass-band of the waveguide vestibule.

The invention further resides in dielectric heating apparatus having novel features hereinafter described and claimed.

For a more complete understanding of the invention and for illustration of various embodiments thereof, reference is made to the accompanying drawing in which:

Fig. 1, in perspective and with parts broken away, schematically shows a dielectric heating applicator having lossy panels in its vestibules;

Figs. 4 and 5 are radiation/frequency curves helpful to an understanding of the present invention;

Figs. 6 and 7 are perspective views showing another type of vestibule with different arrangements of the radiation-suppression panels;

Fig. 8 is an end view, partly broken away, of the entrance vestibule of Fig. 10 of a modification of the apparatus of Fig. 1;

Fig. 9 is a plan view of the vestibule of Fig. 8;

Fig. 10 is a side sectional view taken on line 10—10 of Fig. 8 and additionally showing part of the applicator housing;

Fig. 11 is a partial end elevational view of the exit vestibule for the applicator of Fig. 10 taken on line 11—11 of Fig. 13;

Fig. 12 is a sectional plan view taken on line 12—12 of Fig. 11;

Fig. 13 is a side sectional view taken on line 13—13 of Fig. 11;

Fig. 14 is an enlarged sectional view taken on the line 14—14 of Fig. 13 to illustrate the wall construction of the exit vestibule of Figs. 11–13; and Fig. 15 is an explanatory graph of the kind used in determining resistivity of the lossy material.

Figure 1:
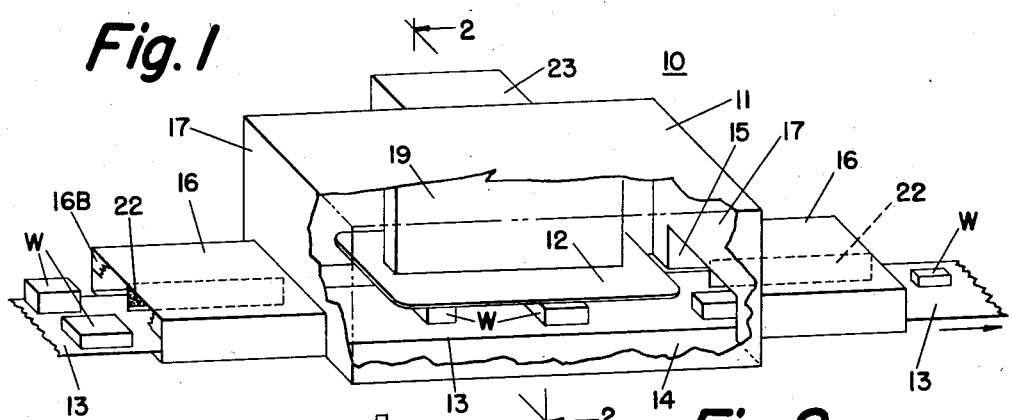
Figure 2:
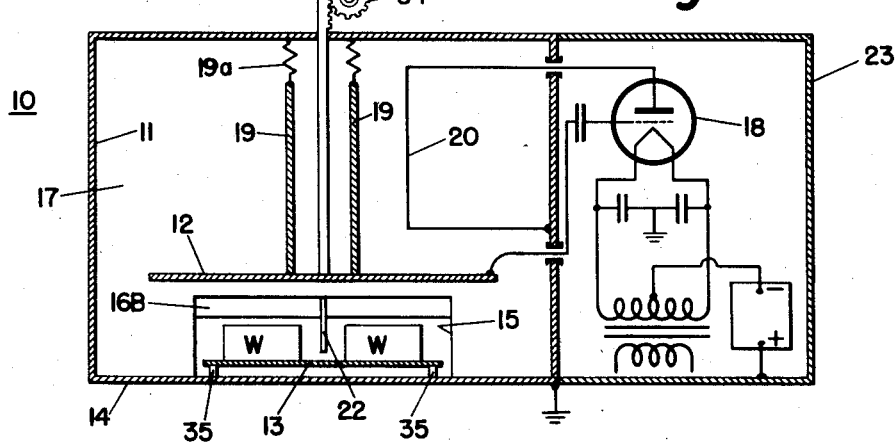
Fig. 2 is a cross-sectional view taken on plane 2—2 of Fig. 1 and additionally schematically shows a suitable oscillator arrangement for supplying the high-frequency heating field.

Referring to Figs. 1 and 2 as schematically illustrative of a 60-kilowatt dielectric heating applicator 10 in which the invention has been embodied, the work W to be heated is disposed in the high-frequency electric field between vertically spaced heating electrodes 12 and 13 within the metallic shielding enclosure 11. In the particular reentrant cavity resonator forming the applicator 10, of the type more fully described and claimed in Warren Patent No. 2,783,344, filed March 26, 1954, one of the heating electrodes 12 is in spaced relation to all walls of a shielding enclosure 11 and the other heating electrode is formed by the metallic work conveyor 13. For such purpose, the conveyor is electrically connected to shielding enclosure 11 at or near its bottom wall, as by straps 35, Fig. 2. In applicators using a non-metallic conveyor belt, the lower heating electrode may be the bottom wall 14 of the enclosure 11, or it may be a separate electrode electrically connected to the bottom or side wall structure and disposed beneath the conveyor.

To permit passage of the work, such as sand cores, into and out of the high-frequency field between the electrodes, the conductive wall structure of the applicator 10 forms a shielding enclosure 11 having openings 15, 15 in its opposite end walls 17, 17. These openings impair the effectiveness of the enclosure 11 as a shield with the result that, in the absence of properly designed vestibules and lossy panel structures disposed therein in manner later described, there may be substantial radiation of high-frequency energy from the applicator. Such extraneous radiation is subject to strict governmental supervision because of its possible interference with various high-frequency services, such as television or radio broadcasting, point-to-point communication, airplane safety services, and the like.

In an effort to reduce such disturbing radiation to levels permissible under governmental regulations, applicators have heretofore been provided with vestibules extending from the enclosure openings in manner generally similar to the vestibules 16 of Fig. 1. However, as will appear from the following discussion, such prior vestibules may permit passage of excessive radiation over a wide band of frequencies and in fact at certain frequencies may result in a higher level of radiation than if they were omitted.

In an embodiment of the invention similar to the one illustrated in Fig. 1, each vestibule 16 of rectangular shape had a width of about fifty-one inches, a height of about eighteen inches and each vestibule extended some ninety-six inches outwardly from the shielding enclosure 11 of the applicator 10. Each vestibule 16 had a partial closure 16B at its end which extended downwardly to a point just above the travel path of the work W. The electrode spacing within the applicator was variable over the relatively wide range of from about six inches to about twenty-two inches. In the preferred oscillator circuit, the operating frequency varies with change in the electrode spacing and for the particular applicator now being described the frequency varied from about 12.8 megacycles per second with the six-inch spacing to about 13.75 megacycles per second with a twenty-two inch spacing of the heating electrodes.

Table A presents the frequency ranges for the particular applicator under discussion together with the frequency range of the harmonics from the second to the twentieth.

*Table A*

| Harmonic | Frequency Range, Megacycles/Sec. | Harmonic | Frequency Range, Megacycles/Sec. |
| --- | --- | --- | --- |
| 1 | 12.8– 13.75 | 11 | 140.6–151.2 |
| 2 | 25.6– 27.5 | 12 | 153.5–165 |
| 3 | 38.4– 41.25 | 13 | 166.2–178.8 |
| 4 | 51.2– 55.2 | 14 | 179.1–192.5 |
| 5 | 64.0– 68.8 | 15 | 192 –206.2 |
| 6 | 76.8– 82.7 | 16 | 204.8–220 |
| 7 | 89.6– 96.5 | 17 | 217.8–233.6 |
| 8 | 102.4–110 | 18 | 230.4–247.5 |
| 9 | 115.2–123.8 | 19 | 243.2–261.3 |
| 10 | 128 –137.5 | 20 | 256 –275 |

It will be seen from Table A that for this particular heating applicator, the ranges of all harmonics higher than the 13th harmonic overlap, thus presenting a continuous wide frequency range of possible interference radiation. For example, the 14th harmonic range overlaps the 15th harmonic range or has the same frequencies (with different electrode spacings) in the range of from 192 to 192.5 megacycles; and the 19th and 20th harmonic ranges overlap from 256 megacycles to 261.3 megacycles. Therefore, energy absorbers tuned to a particular frequency would not be effective as the electrode spacing changes and would be of little value where a part of the bothersome radiation lies in a continuous frequency band. Furthermore, these energy absorbers of the tuned type have amplification characteristics which give rise to increased radiation at certain frequencies.

As indicated above, the wide band of overlapping higher harmonics is due to variation in the heating frequency which in turn is incidental to variation of the spacing between the heating electrodes to accommodate work of different heights or to vary the voltage gradient through the work.

The foregoing may be explained, using as an example an applicator such as illustrated in Figs. 1 and 2 as follows. The applicator 10 forms a high Q (unloaded upincluding oscillator tube 18 (Fig. 2) disposed in an electrically conductive shielding compartment 23. The resonant operating frequency of the applicator or reentrant cavity resonator 10 is predominantly determined by the capacitance of the applicator, as between the heating electrodes 12 and 13, and by the inductance of a reentrant inductance structure shown as a fin 19 including an extensible bellows-like section 19a. The fin 19 is electrically connected at its opposite ends respectively to the upper electrode 12 and to the upper wall structure of the shielding enclosure 11. The conductive wall structure of enclosure 11 forms with the fin 19 and the electrodes 12 and 13 the high-Q power-receiving circuit. The resonant applicator is coupled to a high-frequency source including the tube 18 by a coupling loop 20 in the anode circuit of the tube. The grid excitation for tube 18 is derived from the applicator as by a coupling connection to the fin-electrode assembly 12, 19.

As the spacing between electrodes 12 and 13 is varied as by rotation of gear 34, the operating frequency of the oscillator is varied with corresponding increased range of variation of the harmonic frequencies so that, as previously mentioned, at high harmonics there is a continuous spectrum of possible radiation due to overlapping of the harmonic band ranges. Additionally for any given electrode spacing, the operating frequency and harmonics thereof will also vary with change in dielectric constant of the work and with the volume of work between the electrodes. Such overlapping of higher order harmonics also may exist in systems in which the oscillator must be retuned to supply heating energy to an applicator detuned by the load or by electrode adjustment.

The problem of suppressing radiation from the vestibules of dielectric heating applicators is still further complicated because the presence of work in the vestibules lowers their cut-off frequency, and variably so, depending upon the amount and dielectric constant of work material therein. The result is that more harmonics of the heating frequency may appear in the pass-band of the vestibule. Furthermore, because of differences in moisture content and of temperature, work in the entrance vestibule may have different electrical characteristics than work in the exit vestibule and so may differently affect the cut-off frequencies of the two vestibules 16.

Fig. 4 graphically illustrates the foregoing problems and has been plotted from data taken in connection with an applicator having a vestibule with the dimensions previously set forth. The vestibule was unloaded, i. e., free of work. The magnitude of radiation, in terms of an arbitrary percentage scale representative of radiation voltage, has been plotted as ordinates against frequency on a logarithmic scale extending along the abscissae.

It will be seen that there are many pronounced radiation peaks, several of which, from comparison with Table A, above, may be identified as higher order harmonics of the heating frequencies. The vestibule had a cut-off frequency of 116 megacycles. It will also be seen that the peak $C_1$ occurs at the cut-off frequency.

The cut-off frequency of any vestibule is preferably made as high as possible. The vestibule acts as a waveguide suppressing or cutting off radiation in the band of frequencies below its cut-off frequency. However, in a unit wide enough to accommodate work of large physical size, such as mattresses and the like, the cut-off frequency is materially lowered by reason of the required width of the vestibules.

The high level radiation appearing in Fig. 4 at and above about 116 megacycles indicates the presence within the vestibule of high-frequency energy within the pass-band of the waveguide vestibule.

It has been determined that the extremely high radiation peaks $C_1$ and $C_2$ (Fig. 4) in the vicinity of 120 excitation of the vestibule as a resonant cavity. While these peaks $C_1$ and $C_2$ could be eliminated by removal of the vestibule, there would then result substantial radiation at lower harmoic frequencies. Such radiation is eliminated by the vestibule.

Minor resonances which occurred at particular frequencies at and above about 116 megacycles account for the radiation peaks of intermediate level.

From the foregoing, it will be seen that the provision of the vestibule alone effectively suppressed radiation over a wide range of lower frequencies since it served as a waveguide with an unloaded cut-off frequency of 116 megacycles. The small peak in the vicinity of 13 megacycles represents a low order of radiation due to the very intense electric field between the heating electrodes.

Referring again to Figs. 1 and 2, and further in accordance with the present invention, lossy panel structure 22 is disposed within each vestibule in manner to provide marked attenuation both of the strong radiation peaks and also the high radiation at all frequencies above the cut-off frequency.

As shown in Fig. 1, each panel structure 22 extends lengthwise of the corresponding vestibule 16 substantially midway of the sides and downwardly from the top wall toward the upper face of conveyor 13. So positioned, the plane of the lossy panel structure 22 is substantially coincident with that of the maximum electric field vector of the fundamental mode of the waveguide vestibule which tends to produce radiation, and it is also effective to absorb energy within the vestibule at many harmonics of the heating frequency, particularly those which may fall in the neighborhood of that mode. Since the panel structure 22 is of lossy material, it also attenuates all high-frequency energy within the pass-band of the vestibule having an appreciable electric field vector generally in alignment with the plane of the lossy panel structure 22.

Figure 3A:
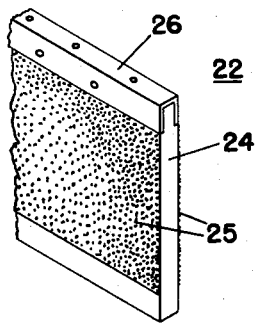
Figs. 3A–3C are perspective views of various lossy panels suited for use in the vestibules of Figs. 1 and 6 to 13.

As shown in Fig. 3A, the lossy panel structure 22 may comprise a thin sheet 24 of plywood or equivalent rigid insulating or dielectric material having its opposite faces or sides coated with a film of resistance material such as a sprayed coating 25 of one of the colloidal suspensions of graphite generally known to the trade by various names "dag" dispersions; one of them being available on the market under the trademark "Aquadag." At the upper edge, the panel structure is mechanically supported from, and if desired, the coatings 25 are electrically connected to, the top wall of the associated vestibule as by the metal angle or channel member 26 suitably fastened to the plywood sheet 24 and providing means for mechanically fastening the upper edge of the lossy panel structure 22 to the upper wall structure of the vestibule.

The effectiveness of the lossy panel structure in attenuation of high-frequency energy is illustrated in Fig. 5. The measurements made for the graph of Fig. 5 were made on the same applicator and vestibule as for Fig. 4 but with a lossy panel structure therein constructed as shown in Fig. 3A and approximately eight feet long and eighteen inches in height. As shown in Fig. 1, the panel structure was midway between the side walls of the vestibule with the plane of the structure parallel to and coincident with a maximum electric field vector for the odd modes of the waveguide vestibule. With the foregoing orientation, the lossy panel structure is most effective and greatly reduces radiation.

As shown in Fig. 5, compared with Fig. 4, there was greatly reduced radiation not only in the frequency range of the peaks $C_1$ and $C_2$ but throughout a wide range of frequencies of from about 116 megacycles to about 300 megacycles. The peak $C_2$ of Fig. 4 is believed due to excitation of a higher mode of the vestibule as a resonant cavity. Nevertheless, the peak $C_2$ of Fig. 5 is shown as greatly reduced from the corresponding peak of Fig. 4. The manner in which the peak $C_2$ of Fig. 5 and other radiation peaks may be further reduced will be later set forth.

Figure 3B:
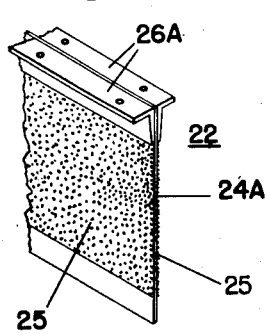

Returning now to Figs. 3A–3C, it is to be understood the lossy panel structure may take various forms. As shown in Fig. 3B, the lossy panel 22 may be a flexible sheet 24A of nonconductive or dielectric material, such as canvas or other fabric, having its opposite faces sprayed or otherwise coated with a thin film 25 of finely divided conductive material, so forming electrically-resistive films or surfaces. As in the lossy panel construction of Fig. 3A, the coatings or films may be electrically connected along their upper edges to the metallic supporting structure 26A which in turn may electrically connect the resistive surfaces to the top wall of the vestibule as well as serving as a mechanical support for the panel structure.

Figure 3C:
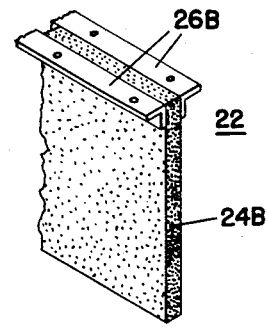

Alternatively, the lossy material may be in bulk form, such as rubber or synthetic material, having filler material, such as carbon or graphite, providing high loss factors. Also, as shown in Fig. 3C, the panel structure 22 may be a thin sheet 24B of suitable lossy dielectric such for example as a synthetic resin preferably of the thermosetting type, such as an epoxy resin, having finely divided carbon graphite, or other conductive material thoroughly mixed therein to impart to it the necessary lossy characteristics and which may be electrically connected to and suspended from the inner face of the upper wall of the vestibule by the supporting bar structure 26B.

In the modification shown in Fig. 6, the top wall 16A of the vestibule is gabled to raise the loaded cut-off frequency of the vestibule and so increase the number of lower order harmonics which are suppressed by the attenuator or high-pass filter action of the vestibule itself. For the same cut-off frequency, the vestibule may be made wider for passage of wide work. Furthermore, by so gabling the top wall, the lossy panel 22 may be disposed as shown in the attic space so formed. As in the modification of Fig. 1, this lossy panel within the vestibule dissipates high-frequency energy within the pass-band of the waveguide vestibule.

The upper edge of panel 22 is connected to the peak or apex of the gable with the lower free edge of panel 22 terminating at or about the level of the upper edges of the side walls of the vestibule. With such gable construction, the panels may be of substantial height (7 inches in one embodiment of the invention) without reduction in the height of work which can be passed through the vestibule.

Measurements made of the radiation from the vestibule of a modification of the invention of the type illustrated in Fig. 6 in general agreed with those forming the basis of Fig. 5.

In order to reduce further the radiation, particularly the radiation peaks due to excitation of the vestibule at higher and even modes as a resonant cavity (as, for example, the peak $C_2$ around 240 megacycles illustrated in Fig. 5), additional lossy panel structures 22A may be provided as shown in Fig. 7.

Each panel structure 22A is disposed in substantial coincidence with the location of an electric field vector of a higher excitation mode of the vestibule 16. Specifically as shown in Fig. 7, the supplemental lossy panels 22A, 22A are disposed lengthwise of the vestibule and respectively substantially midway between the adjacent side wall and the primary lossy panel structure 22.

In constructions in which a conveyor passes through a vestibule with substantial spacing from both the top and bottom walls of the vestibule, lossy panels may also be disposed below the work path—i. e., between the bottom wall of the vestibule and the work-supporting flight of the conveyor. As exemplary of such construction, reference is made to Figs. 8 to 13 for illustration of the invention as applied to an installation of three 200 kilowatt dielectric heaters in tandem on one conveyor for drying of foam-rubber mattresses, seat cushions and the like.

In the particular exemplary installation under discussion, the three heating frequencies are variable over a range from about 10 to about 13.5 megacycles so that all harmonics above the 3rd form a continuous band. Each heater or applicator, of the type shown in Fig. 2, operates at a frequency determined by the particular spacing between the heating electrodes. In normal operation, the spacing of the electrodes and the operating frequency of each applicator will differ. In this installation, the conveyor belt 13A is about 9 feet wide and, accordingly, the width of the entrance vestibule 21A, Fig. 8, as well as the exit vestibule 21B, Fig. 11, is somewhat greater than 9 feet. These vestibules each form a waveguide whose cut-off frequency is about 53 megacycles. Accordingly, the vestibules themselves act to suppress radiation of the lower order harmonics of the heating frequency, i. e., below about 53 megacycles. Since the frequency range of the electric fields of the applicators extends between about 10 to about 13.5 megacycles, it will be seen from Table B that there is present a continuous frequency spectrum of high-frequency radiant energy having a low limit at 40 megacycles, within the range of frequency of the 3rd harmonic.

*Table B*

| Harmonic: | Frequency megacycles |
|---|---|
| 1 | 10 to 13.5 |
| 2 | 20 to 27 |
| 3 | 30 to 40.5 |
| 4 | 40 to 54 |
| 5 | 50 to 67.5 |

Measurements taken on a system of the type under discussion and in the absence of lossy panel structures yielded a graph generally similar to Fig. 4. The first really high peak of radiation (like $C_1$ of Fig. 4) occurred at about 53 megacycles. The resultant radiation was about five times the allowable radiation specified by the Federal Communications Commission as maximum.

To suppress the higher order harmonics of the heating frequency which are within the pass-bands of the vestibules and to preclude cavity excitation at significant low order modes, each of the two vestibules is provided with two sets of lossy panel structures extending lengthwise of the vestibule and respectively disposed above and below the path of the work as transported by conveyor 13A. After these panels were installed in the manner now to be described, the radiation was further reduced to around one-quarter of the maximum allowable, a reduction in excess of 20 to 1, or more than 26 decibels.

Specifically as shown in Figs. 8 to 10, the entrance vestibule 21A is provided with a set of upper panel structures 22E and a set of lower panel structures 22F. Since the entrance vestibule is about 16 feet long, each of these panel structures, as shown in Fig. 10, is preferably made up of a series of individual panels. The upper panels 22E are electrically and mechanically connected along their upper edges to the upper wall structure of vestibule 21A by suitable means, such as the angle bars 26C and fastening screws (not shown), or equivalent. The panels 22E extend downwardly from the upper walls into the attic space above the work path with their lower edges spaced from the upper flight of conveyor belt 13A. The entrance end has a closure 21C for the upper portion of the vestibule. The clearance in the particular installation shown is about 6½ inches. The lossy panels 22E are disposed in longitudinal rows laterally spaced to minimize, as above discussed in connection with Fig. 7, excitation of the vestibule as a resonant cavity in at least its two most significant modes as well as to absorb radiant energy of other frequencies.

The lower lossy panels 22F are supported intermediate the upper and lower (forward and returning) flights of conveyor 13A by the metal sheet 28 which is just below the upper flight of conveyor 13A. The metal sheet 28 is preferably suitably stiffened, as by cross-pieces 29. The sheet 28 is supported by the beams 27 extending lengthwise of the conveyor. The panels 22F are electrically and mechanically connected along their upper edges to sheet 28 by the angle bars 26D. Sheet 28 in turn is electrically connected to the side walls of the vestibule. The lower edges of panels 22F are close to but clear the lower flight of conveyor 13A which, in turn, is close to the bottom wall of vestibule 21A.

The lossy panels 22F are disposed in laterally spaced rows as discussed in connection with Fig. 7 to minimize excitation of at least the two most significant modes of vestibule 21A. The space in which panel structure 22F extends may be considered as a second waveguide separated from the upper waveguide by the conductive wall 28. However considered, the panels suppress and attenuate radiation therefrom. It may be noted that four rows of lossy panels 22F are used below the work, whereas three rows 22E are provided above the work. The two closely-spaced central rows of panels 22F, Fig. 8, are on opposite sides of a centrally disposed I-beam 30 and jointly serve the same purpose as the single central row of upper panels 22E. Each of the two lower central panels 22F has about twice the resistance per square as compared with each of the outer panels so that each pair of central panels is of the same combined effective resistance as one of the outer panels. The central rows of panels 22F, Fig. 8, may be covered by a lesser number of coats of the "dag" dispersion than the outer panels 22F in order to have the differential of resistance indicated above. As exemplary, the adjacent centrally located rows may have five coats of a "dag" dispersion, for example, the Acheson Grade No. 213, whereas the remaining rows of high-frequency energy-absorbing material intermediate the flights of the conveyor and in the attic space, may have ten coats of the foregoing composition. That composition comprises an epoxy resin solution including about 28% solids in the form of colloidal graphite. The "dag" Grade 213 is preferably baked at 425° F. for seventeen minutes in assurance of securement of the desired coating. The panels themselves may be of a material available under the trademark "Transite," a material formed of asbestos fiber and Portland cement. It is available in dense, monolithic sheets from Johns-Manville.

One group of panels 22F is apertured (as indicated by hole 36 of Fig. 10) to clear one of the cross-beams 31 of the conveyor-supporting framework. Alternatively, as shown in Fig. 13 for the cross-beams 32, adjacent panels 22H may be complementarily notched for the same purpose. As shown in Fig. 10, the overall length of the rows of lower panel structures 22F may be made greater than the length of the entrance vestibule itself by extending them into the applicator housing 11A. Since these panels 22F are below the conveyor which is serving as the lower heating electrodes, they are outside of the heating field produced between the electrodes, whereas a similar extension of the rows of upper panel structures 22E the same distance would expose them to such field.

The heated foam-rubber or other products leaving the applicator housing 11A are, in the particular installation under discussion, passed through seven 20-foot sections of a hot-air oven to maintain them at elevated temperature for a substantial period of time. The entire length of this soaking chamber or oven is utilized as a radiation-suppressing waveguide by lining it with sheet metal or making it of sheet metal with a covering of suitable heat insulation, with or without an outside metal covering as shown in Fig. 14. In Fig. 14 the insulation 45 is disposed between the metal sheets 46 and 47 which may be sheet aluminum. Because of the cross-sectional dimensions of the exit vestibule, approximately ten feet wide by four feet high, the soaking oven or exit vestibule 21B serves as a waveguide having a cut-off frequency of about 53 megacycles and is therefore effective as a high-pass filter to suppress radiation of the lower order harmonics of the heating frequency up to the 5th.

To suppress radiation of higher order harmonics and to minimize excitation of the exit vestibule 21B as a resonant cavity at its several odd and even modes, the lossy panel structures are disposed in one or more of the oven sections, preferably the last section shown in Figs. 11 to 13. The upper panel structure comprises panels 22G electrically and mechanically connected to the upper wall structure of the soaking oven or exit vestibule 21B by the angle straps 26C or equivalent. The panels are disposed in three laterally spaced rows extending lengthwise of the vestibule, as and for the purposes described in connection with Fig. 7, with their lower edges clearing the path of work on the upper conveyor flight. The lower lossy panels 22H are electrically and mechanically connected along their upper edges to the supporting framework or grid structure formed by cross-pieces 32 and the angle strips 26E. The upper corners of the intermediate panels 22H are notched (Fig. 13) to clear the cross-members 32. At their opposite ends, the cross-pieces 32 are supported by the beams 27 of the conveyor-supporting frame. The lower edges of lossy panels 22H are closely adjacent the upper face of the lower flight of conveyor 13A closely spaced from the lower wall of vestibule 21B. The end panels 22H are notched (Fig. 13) intermediate their upper and lower edges for passage of the cross-beams 31 of the conveyor-supporting framework.

As in the entrance vestibule 21A, the two central or middle rows of the lower lossy panels 22H in exit vestibule 21B, Fig. 11, are closely spaced along opposite sides of the I-beam 30 with each pair of panels thereof jointly having the same effective dissipation effect as a single panel in each outside row.

The fans 33, 33, Fig. 13, beyond the ends of lower panels 22H are part of a system for circulation of air through the applicator and vestibules. The panels extending lengthwise of the vestibules do not interfere with the air-circulating system which may include a duct 40 fractionally shown in Fig. 11.

As above stated, the conveyor 13A which extends through and beyond the entire equipment including the entrance vestibule 21A, the three applicators and the exit vestibule 21B included as a part of the hot air oven may be metallic to serve as the lower heating electrodes within each of the applicators. For such purpose, it is effectively grounded to the side wall structure of the applicator housing through the conveyor framework, as for example, by its sliding contact with the supporting bars, Figs. 8 and 11. The channel-supporting bar of Fig. 8 is connected to the side walls by bonding straps 41. However, the metallic conveyor belt does not in practice form a perfect shield, and in the absence of lower panels 22F, 22H, there may be undue radiation from the lower part of the vestibule below the upper flight of the conveyor belt. In effect, the metallic conveyor divides each vestibule into an upper vestibule for the work and a lower vestibule below the work path. Pass-band radiation and excitation of the upper vestibules are suppressed by lossy panels 22E, 22G and pass-band radiation and excitation of the lower vestibules are suppressced by lossy panels 22F, 22H.

If the conveyor is non-metallic, the lower heating electrode may be a metal sheet disposed within the applicator housing 11A below the conveyor belt and well bonded to the walls to form a complete shield of high effectiveness. With such construction, the transfer of energy to the space below this sheet may be effectively prevented, in which case the lower lossy panels 22F and 22H may be omitted.

With its entrance and exit vestibules provided with the above-described lossy panels, the dielectric heating system of Figs. 8 to 13, despite the operation of the several applicators at different frequencies and each at power levels as high as about 200 kilowatts, is not an objectionable source of disturbing radiation. In this connection, it is pointed out that governmental regulations require that the maximum radiation on any one frequency in any direction must not exceed 10 microvolts per meter, at one mile from the dielectric heater, and if certain services, i. e., airplane landing systems and navigation aids are less than one mile from the heater, the radiation must be sufficiently lower than the foregoing maximum to preclude interference. The arrangement of the present invention provides a shielding attenuation of the order of 76 decibels, an attenuation adequate to reduce the power level of 200 kilowatts at each operating frequency to about 0.005 watt. Such a high degree of shielding attenuation reduces the maximum radiation to below the maximum limit specified by the aforesaid FCC regulations.

In all of the modifications previously described, the height of the vestibule above the work path is made as great as practical for enhanced height of the lossy panels, but the height is not made so great that the vestibule can be excited in modes for which a corresponding electric field vector may be in planes at right angles to the lossy panels rather than in planes coincident with them. Nevertheless, the presence of panel structure, regardless of orientation, or of bulk lossy material in a substantial part of the space not occupied by work will absorb radiant energy. Accordingly, in presenting the preferred form of the invention, I do not intend to exclude these alternative arrangements.

In the foregoing description reference has been made to the resistance per square of the lossy panel structure of the vestibules. While the resistance per square is not critical in value and for a given installation can vary by a substantial amount, nevertheless it is preferably selected to have a value within the range providing maximum absorption or attenuation of radiant energy within each vestibule. The preferred value may be determined as follows: The frequency of the radiant energy to be suppressed is selected and will ordinarily correspond with the cut-off frequency of the vestibule. That frequency is selected for the reason that at cut-off a radiation peak of maximum value is likely to occur. Having selected the foregoing frequency, its wavelength in air is then known. Maximum absorption and attenuation of high-frequency energy at the selected frequency will occur when the imaginary or lossy part $\delta$ of the dielectric constant of the energy absorbing material has a value at which the imaginary part (Im) of the quantity $$\frac{2\pi}{\lambda_g}$$

is maximum. ($\lambda_g$ is the propagation wavelength within the vestibule for said selected frequency corresponding with the dominant mode.) By assuming a number of values for the lossy part $\delta$ of the dielectric constant as from 0 to upwardly of 4 and plotting corresponding values of the foregoing quantity, a curve or graph is obtained, Fig. 15, which is concave downwardly. Thus there may be determined the particular value of the lossy part $\delta$ of the dielectric constant for which the aforesaid quantity is maximum.

Having thus determined the optimum value for the lossy part of the dielectric constant (for one application for a cut-off frequency of about 46 megacycles it was 2.75, as shown by the graph 44), the following equation may be utilized:

$$R/\text{sq.} = \frac{120 x n}{E_\delta}$$

where $\delta$ = the value at which the quantity $$\text{Im}\left(\frac{2\pi}{\lambda_g}\right)$$

is maximum, $n$ = the number of panels,
$x$ = the wavelength in air at the cut-off frequency divided by twice the width of the vestibule, and
$E$ = the real part of the dielectric constant of an assumed volume or slab of lossy material within the vestibule equivalent in energy absorption to the panel structures and occupying a volume equal to the product of the area of a panel structure multiplied by the width of the vestibule. In most cases it may be taken as unity.

In the foregoing assumption, the curve 44 by means of which the value of 2.75 was selected has a fairly broad top and such that the resistance per square could have any value from about 110 ohms to about 160 ohms to produce satisfactory attenuation of the radiant energy. These resistance values correspond respectively with values of $\delta$ equal to 3.25 and 2.25. Obviously, substantial attenuation is obtained with values of the $\delta$ below 1.5 and as high as 4. Depending upon the cut-off frequency of different vestibules, the energy-absorbing panel structures embodying the present invention have had resistances per square varying from around 110 ohms to around 300 ohms.

In general, to minimize radiation from a dielectric heating applicator, the pass-band of the vestibules should be as high as possible, i. e., the vestibules should be as narrow as possible consistent with maximum size of the work to be heated; also, the lossy material is preferably concentrated in one or more planes substantially coincident with the location of the respective electric field vectors of one or more cavity modes excited by a corresponding harmonic of the heating frequency.

What is claimed is:

1. Dielectric heating apparatus comprising spaced heating electrodes, an electrically conductive shielding housing for confining therein the high-frequency electric field produced between said electrodes, said housing having a wall opening for a work path extending to the field space between said electrodes, an electrically conductive vestibule extending from said housing and about said work path, said vestibule serving as a waveguide having a cut-off frequency materially higher than the frequency of said heating field, and lossy material disposed within and throughout a substantial length of said vestibule and in a position in substantial coincidence with the location of at least one of the electric field vectors of substantial magnitude corresponding with excitation modes of said vestibule, said lossy material having characteristics for dissipating high-frequency energy within the pass-band of the waveguide vestibule.

2. The dielectric heating apparatus as in claim 1 in which said lossy material comprises lossy panel structure of substantial width disposed lengthwise of the vestibule in spaced relation to the side walls thereof for suppression of radiation.

3. The dielectric heating apparatus as in claim 1 in which said lossy material comprises lossy panel structure of substantial width disposed lengthwise of the vestibule in substantial coincidence with the location of at least one of the electric field vectors of substantial magnitude corresponding with excitation modes of the vestibule.

4. The arrangement of claim 3 in which said panel structure is midway between the side walls of the vestibule.

5. The dielectric heating apparatus as in claim 3 in which said lossy panel structure is disposed in laterally spaced rows for absorption of radiant energy at frequencies corresponding with a plurality of modes of excitation of the waveguide vestibule.

6. The dielectric heating apparatus of claim 3 in which said panel structure is disposed in rows, at least two of said rows being intermediate a centrally located row and the adjacent side walls.

7. The dielectric heating apparatus as in claim 3 in which the upper edge of the lossy panel structure is electrically connected to the upper wall structure of the vestibule, said panel structure extending downwardly with the lower edge thereof clear of the path of work to be heated between the electrodes.

8. Dielectric heating apparatus comprising spaced heating electrodes, an electrically conductive shielding housing for confining therein the high-frequency electric field produced between said electrodes, said housing having a wall opening in alignment with a work path for passage of work into said field, an electrically conductive vestibule extending from said housing and about said work path, said vestibule having a waveguide cut-off frequency materially higher than the upper limit of said high-frequency field and having upper wall structure substantially spaced above the work path, and lossy material disposed in the vestibule in the space above said work path and extending from said wall opening lengthwise of said vestibule towards the open end of said vestibule, said lossy material having characteristics for dissipating high-frequency energy for suppression of harmonics of said high-frequency field within the pass-band of said waveguide vestibule.

9. The dielectric heating apparatus as in claim 8 in which the lower heating electrode is a metallic conveyor whose upper and lower flights pass through said vestibule, and which additionally includes lossy material disposed in the space between the upper and lower flights of the conveyor.

10. Dielectric heating apparatus comprising vertically spaced heating electrodes, an electrically conductive shielding housing for confining therein the high-frequency field produced between said electrodes, said housing having openings in opposite walls in alignment with a work path for passage of work through said field, entrance and exit vestibules respectively extending from said opposite walls of the housing in alignment with said work path and the corresponding openings, said vestibules being electrically conductive and dimensioned to serve as waveguides, each having a substantial space above the uppermost level of the work path, and lossy panel structure extending lengthwise of each of said vestibules clear of work movable along said work path.

11. The dielectric heating apparatus as in claim 10 in which the bottom wall structures of said vestibules are spaced a substantial distance below said work path to provide a work-free space, and additional lossy panel structure disposed lengthwise of each vestibule in said work-free space.

12. A dielectric heating apparatus in which there is a minimum of radiation of high-frequency energy therefrom comprising a reentrant cavity resonator including inductance and capacitance elements forming with the wall structure of the cavity resonator a high-Q power-receiving circuit for the heating of dielectric material disposed within the electric field produced between heating electrodes thereof, said wall structure having at least one opening in alignment with a work path for passage of work to and from the space between said heating electrodes, an electrically conductive vestibule extending from said housing and about said work path, said vestibule comprising a waveguide having dimensions for a cut-off frequency higher than the maximum frequency of said electric field between said heating electrodes, and lossy panel structure disposed within said vestibule in spaced relation with said work path for attenuation of all high-frequency energy appearing therein and particularly at frequencies above said cut-off frequency.

13. A dielectric heating apparatus in which there is a minimum of radiation of high-frequency energy therefrom comprising a reentrant cavity resonator including inductance and capacitance elements forming with the wall structure of the cavity resonator a high-Q power-receiving circuit for the heating of dielectric material disposed within the electric field produced between said heating electrodes thereof, said wall structure having at least one opening in alignment with a work path for passage of work to and from the space between said heating electrodes, an electrically conductive vestibule extending from said housing and about said work path, said vestibule comprising a waveguide having dimensions for a cut-off frequency higher than the maximum frequency of said electric field between said heating electrodes, and lossy material as a whole having substantial length and breadth disposed within said vestibule and at least in the space above said work path extending from said wall opening lengthwise of said vestibule towards the open end of said vestibule, said lossy material having characteristics for attenuation of high-frequency energy at all frequencies appearing in said vestibule.

14. The apparatus of claim 13 in which said vestibule is provided with an attic space above said work path and in which there is included at least one energy-absorbing structure extending lengthwise of said path and downwardly toward said work path.

15. The apparatus of claim 14 in which there are provided a plurality of said energy-absorbing structures respectively extending lengthwise of said path and spaced laterally thereof one from the other.

16. The apparatus of claim 14 in which there are provided a plurality of said energy-absorbing structures respectively extending lengthwise of said path and spaced laterally thereof one from the other, at least one of them being located in substantial coincidence with the maximum electric field vector of the fundamental excitation mode of said second cavity for suppression of radiation of the corresponding frequency thereof.

17. The apparatus of claim 13 in which said work path includes a conveyor, and energy-absorption structure extending lengthwise of said conveyor below the upper flight thereof for absorption of high-frequency energy.

18. The apparatus of claim 17 in which there are provided a plurality of rows of said energy-absorbing material disposed lengthwise of said conveyor and spaced one from the other laterally thereof, at least one row being disposed in substantial coincidence with the location of the maximum electric field vector corresponding with the fundamental excitation mode of said second cavity resonator.

19. In a high-frequency dielectric heating system including a reentrant cavity resonator having wall structure forming an electrically conductive housing having inductance structure and spaced electrodes forming the inductance and capacitance elements of a high-Q power-receiving circuit which primarily determines the operating frequency of an associated oscillator, said cavity resonator having at least one opening for passage of work along a work path and into the electric field produced between heating electrodes thereof, the combination of electrically conductive wall structure forming a vestibule extending from each said opening and about said work path, said vestibule comprising a waveguide having dimensions establishing a cut-off frequency materially higher than the frequency of the electric field produced between said electrodes with a maximum separation distance therebetween, and lossy material disposed within and throughout a substantial length of said vestibule in the space above said work path, said lossy material having characteristics for absorption and dissipation of high-frequency energy within the pass-band of said waveguide for suppression of radiation of high-frequency energy therefrom.

20. The system of claim 19 in which said vestibule is provided with an attic space above said work passage and in which said lossy material includes at least one energy-absorbing structure extending lengthwise of said path and downwardly toward said work path.

21. The system of claim 19 in which said lossy material includes a plurality of energy-absorbing panel structures respectively extending lengthwise of said path and spaced laterally thereof one from the other, at least one of them being located in substantial coincidence with the maximum electric field vector of the fundamental excitation mode of said vestibule and other of said structures being disposed in substantial coincidence with maximum electric field vectors of higher modes of excitation of said vestibule.

22. The system of claim 19 in which said work path includes a conveyor, and energy-absorption panel structure extending lengthwise of said conveyor below the upper flight thereof for absorption of high-frequency energy.

23. The system of claim 22 in which there are a plurality of rows of said energy-absorbing panel structures disposed lengthwise of said conveyor and spaced one from the other laterally thereof, at least one row being disposed in substantial coincidence with the location of the maximum electric field vector corresponding with the odd excitation modes of said waveguide vestibule and said other rows being disposed in substantial coincidence with the maximum field vectors corresponding with the even excitation modes of said waveguide vestibule.

24. The system of claim 19 in which the lossy part of the dielectric constant of said lossy material has a value at which the quantity $$\mathrm{Im}\left(\frac{2\pi}{\lambda_g}\right)$$

is near or at its maximum value, where $\lambda_g$ is the propagation wavelength within the vestibule of a selected frequency corresponding with a dominant mode of said vestibule.

References Cited in the file of this patent

UNITED STATES PATENTS

| | | |
|---|---|---|
| 2,467,230 | Revercomb et al. | Apr. 12, 1949 |
| 2,505,557 | Lyman | Apr. 25, 1950 |
| 2,684,469 | Sensiper | July 20, 1954 |
| 2,732,473 | Ellsworth | Jan. 24, 1956 |

FOREIGN PATENTS

| | | |
|---|---|---|
| 671,206 | Great Britain | Apr. 30, 1952 |